United States Patent
Stiglic

Patent Number: 6,150,934
Date of Patent: Nov. 21, 2000

[54] ELECTRONIC COMMUNICATION SYSTEM BETWEEN A BASE STATION AND TRANSPONDERS

[75] Inventor: Maksimilijan Stiglic, Maribor, Slovenia

[73] Assignee: EM Microelectronic-Marin SA, Marin, Switzerland

[21] Appl. No.: 09/236,228

[22] Filed: Jan. 22, 1999

[30] Foreign Application Priority Data

Jan. 22, 1998 [EP] European Pat. Off. .............. 98101058

[51] Int. Cl.⁷ .................................................. G08B 26/00
[52] U.S. Cl. .................. 340/505; 340/572.1; 340/573.1; 340/10.1
[58] Field of Search .................................. 340/572.1, 505, 340/572.5, 573.1, 10.1, 10.3

[56] References Cited

U.S. PATENT DOCUMENTS

| | | | |
|---|---|---|---|
| 5,365,551 | 11/1994 | Snodgraa et al. | 375/1 |
| 5,838,235 | 11/1998 | Thorigne | 340/572.1 |

FOREIGN PATENT DOCUMENTS

| | | |
|---|---|---|
| 0 161 779 | 11/1985 | European Pat. Off. . |
| 0 427 342 A1 | 5/1991 | European Pat. Off. . |
| 0 585 132 A1 | 3/1994 | European Pat. Off. . |
| 0 779 520 A2 | 6/1997 | European Pat. Off. . |

*Primary Examiner*—Daryl Pope
*Attorney, Agent, or Firm*—Griffin & Szipl, P.C.

[57] ABSTRACT

A communication system comprising a base station (20) and a plurality of transponders (TR; 21 to 26), the base station (20) emitting an electromagnetic field (1) defining a communication volume (2) in which several transponders (21, 22, 23) are susceptible to be situated. The transponders are adapted to generate identification messages (30) in response to the electromagnetic field (1). The base station (20) is adapted to selectively communicate with each transponder by generating communication initiation signals (40) in response to the identification messages (30). Each transponder is adapted to open a communication window (60) in response to a communication initiation signal (40) during which information may be exchanged and/or commands may be sent.

9 Claims, 5 Drawing Sheets

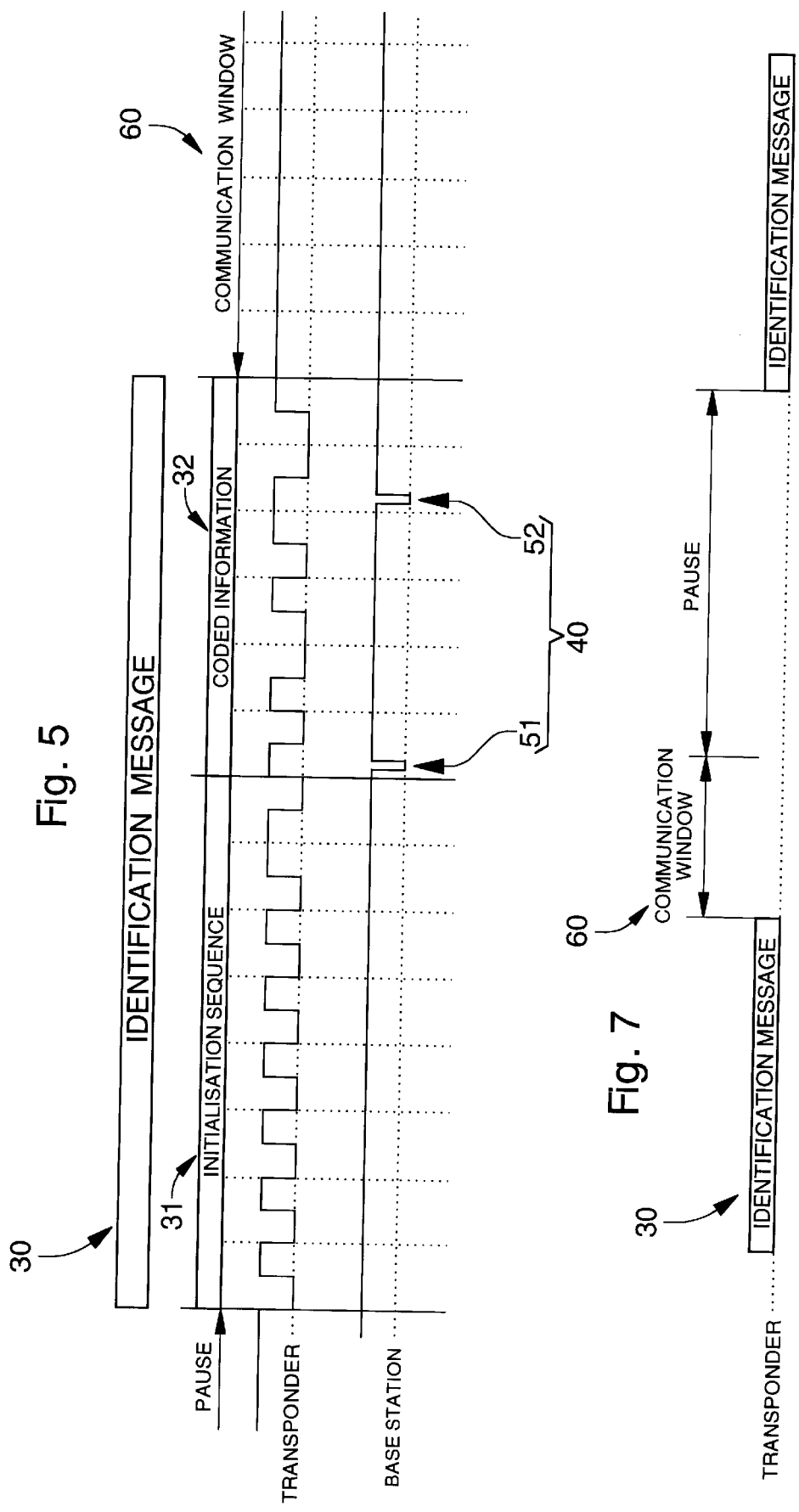

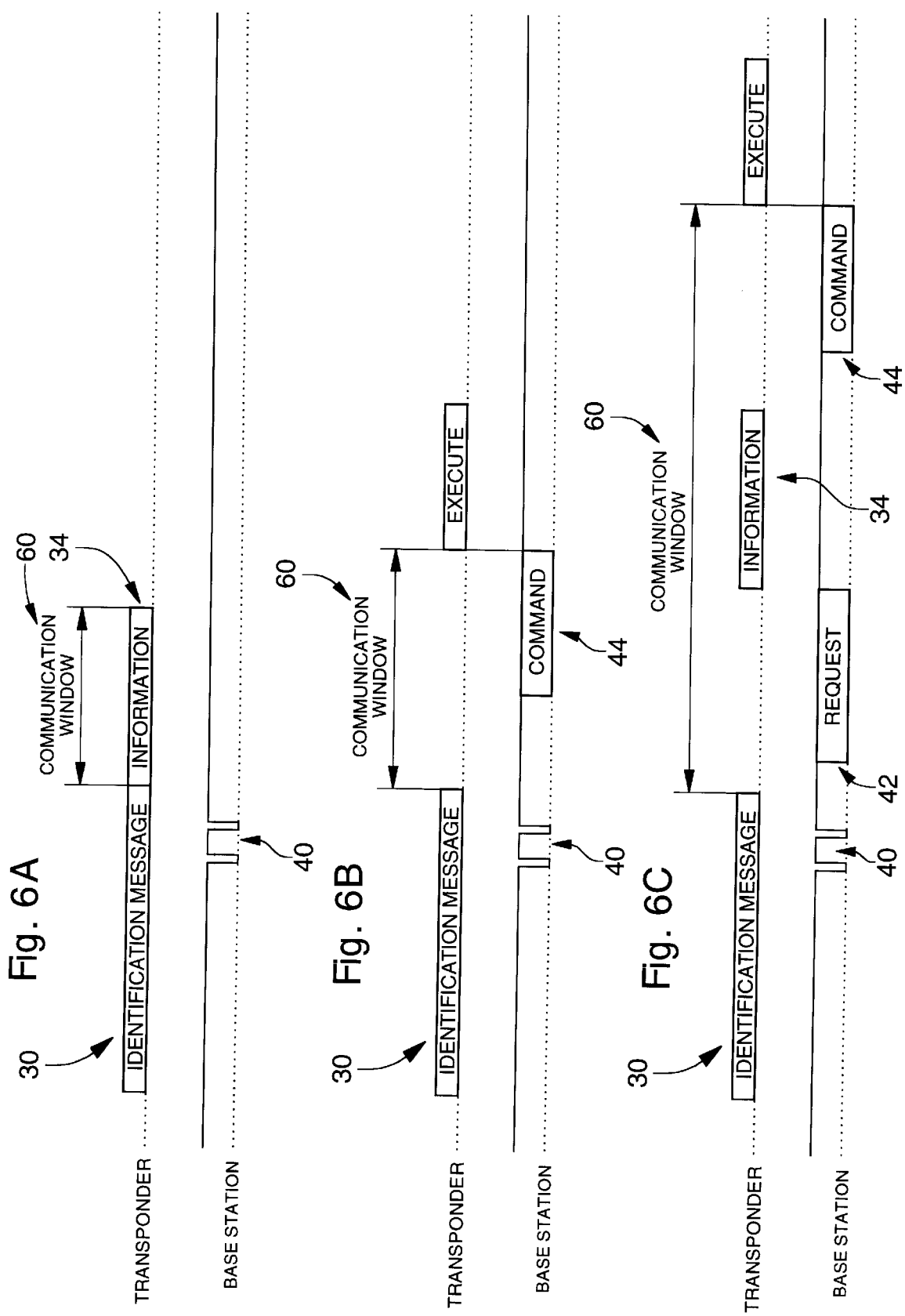

ELECTRONIC COMMUNICATION SYSTEM BETWEEN A BASE STATION AND TRANSPONDERS

FIELD OF THE INVENTION

The present invention relates to a contactless electronic communication system or so-called RFID system. Such systems, which are typically used for identifying people, animals or goods (such as vehicles, goods necessitating a marking and subsets in an assembly line, etc.), principally comprise an interrogator/reader and one or more transponders associated with an item which has to be identified.

The interrogator/reader emits an interrogation signal in the form of an electromagnetic radiation. The transponders subjected to this electromagnetic interrogation field reply by generating a response signal consisting normally of a modulation of this field, and providing generally a code/address identifying the transponder.

BACKGROUND OF THE INVENTION

European patent EP 0 161 779 discloses such an identification system in which the interrogator/reader is adapted to re-emit the identification code transmitted by a transponder. Each transponder comprises means for comparing the re-emitted identification code with its own identification code, and is adapted to deactivate itself upon match.

European patent application EP 0 585 132 discloses another identification system in which the identification protocol is significantly simplified. In this system, the interrogator/reader is adapted to emit a signal upon reception of an identification message transmitted by one of the transponders in the form of a modification of the interrogation signal. This modification is effected synchronously to the response signal, each transponder being adapted to cease transmission of the response signal upon detection of the modification of the interrogation signal.

The identification system disclosed in the above-mentioned application gives a simple and reliable solution to the problem of identification and counting of a plurality of transponders. This system is however restricted to the transmission of an inhibition command to the identified transponder and is thus limited to identification and counting applications of a plurality of transponders.

SUMMARY OF THE INVENTION

An aim of the present invention is to provide a communication system which, in addition to identifying a plurality of transponders, enables the interrogator/reader (hereafter called base station) to selectively command and/or selectively exchange information with these transponders.

The invention has thus as object a contactless electronic communication system comprising a base station and a plurality of transponders, the base station comprising transmission means for emitting an electromagnetic field defining a communication volume in which several transponders are susceptible to be situated, each transponder comprising means for receiving said electromagnetic field and means for generating, in response to said electromagnetic field, an identification message susceptible to be read by the base station, this base station further comprising means for receiving said identification message emanating from any transponder among said plurality of transponders, and processing means for checking the validity of said identification message, this communication system being characterized in that the base station comprises means for generating communication initiation signals destined to said plurality of transponders, said base station providing a communication initiation signal to each transponder from which it receives an identification message, each transponder being adapted to open a communication window in response to said communication initiation signal only when it is received during a predetermined period relatively to the generation of said identification message.

There results from these characteristics that the communication system allows greater communication possibilities between the base station and the transponders.

An advantage of the present invention lies in the fact that it is possible to selectively communicate with each identified transponder. Indeed, each transponder being individually identified by the base station, only the identified transponder is able to communicate with the base station.

Another advantage of the present invention is to allow multiple communication modes between the base station and the transponders, for instance a command mode where at least one command is sent to the transponder in order to be subsequently executed, or a reading mode where the base station reads information contained in a memory of the transponder. A combination of command and reading modes may easily be envisaged within the scope of the invention.

Another advantage of the present invention lies in the fact that is possible to selectively adapt the communication between the base station and the transponders according to the identification emitted by the transponders. According to the present invention, it is indeed possible to initiate a specific communication for each identified transponder.

Other characteristics and advantages of the present invention will come apparent from the reading of the detailed description which follows, made with reference to the annexed drawings given purely as examples and in

BRIEF DESCRIPTION OF THE DRAWINGS

FIG. 5 shows an example of the structure of an identification message and of a communication initiation signal according to the present invention;

FIGS. 6A to 6C present three embodiments of the communication system according to the present invention; and FIG. 7 illustrates a situation where no communication is received by the transponder.

DETAILED DESCRIPTION OF THE INVENTION

Figure 1:
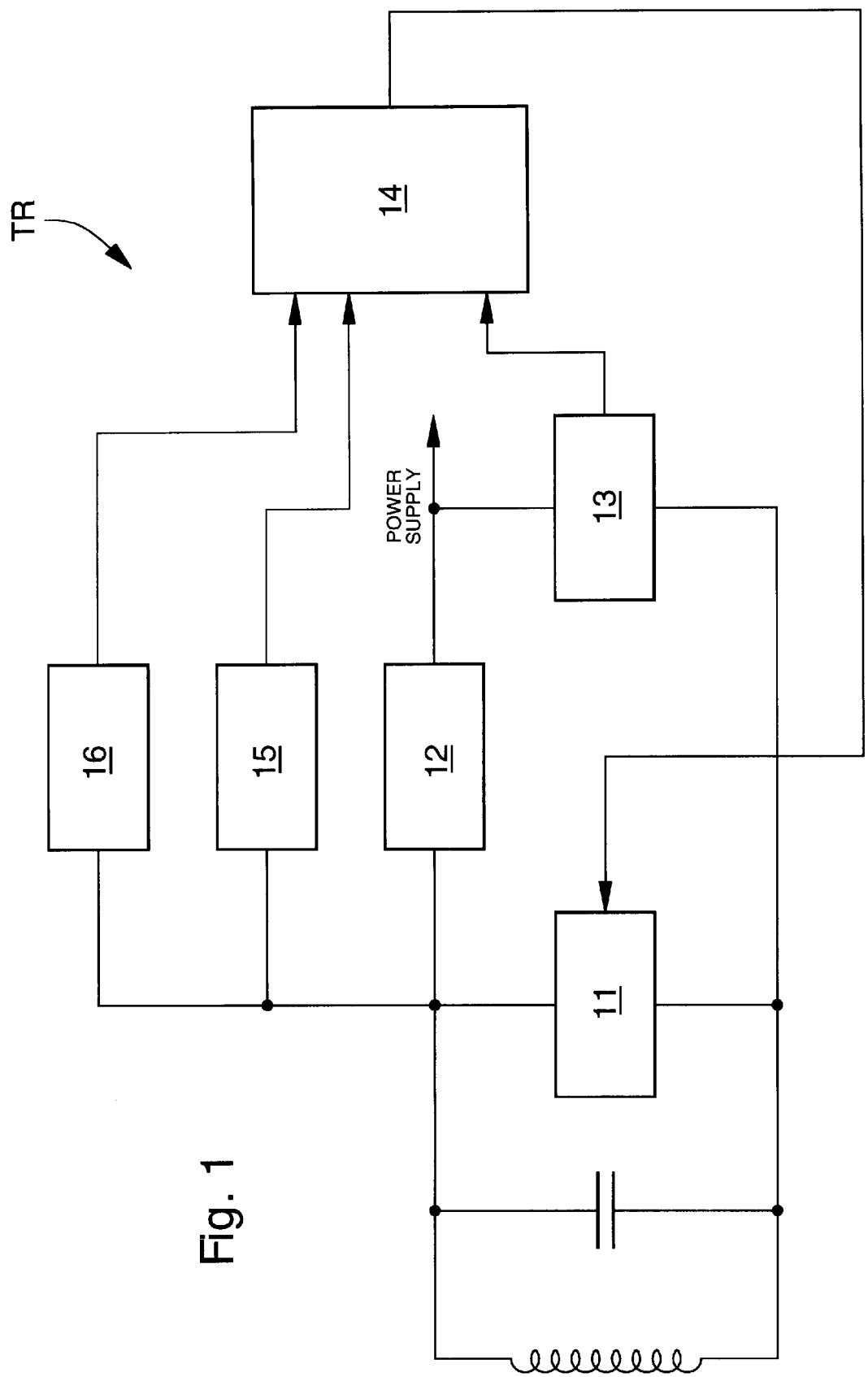
FIG. 1 is a block diagram of a transponder used in the present invention.

In the example which will be described hereafter, the transponders used in the communication system are preferably passive, i.e. they derive their energy from the electromagnetic field to which they are subjected. This is however not limitative since active transponders may also be employed. FIG. 1 presents a bloc diagram of a passive transponder indicated generally by reference TR. This transponder comprises a resonant circuit formed typically of an inductance and a capacitance (not indicated by any reference) connected in parallel, and an electronic circuit which may easily be realised on a single integrated circuit. A modulator 11 allows coding of information to be transmitted to the base station. This is achieved by commutation of the resonant circuit. The electromagnetic coupling thus created can be detected by the base station.

The power supply of the electronic circuit is derived from the ambient electromagnetic field via the resonant circuit and thereafter rectified by a rectifier 12.

An initialisation circuit 13 enables to initialise a logic unit 14 when the power supply is sufficient for guarantying an adequate functioning of the transponder. A clock signal is extracted from the ambient electromagnetic field frequency by means of clock extracting means 15. Each transponder thus function synchronously with the base station.

A monostable trigger 16 further allows the detection of interruptions of the electromagnetic field. Its time constant has a period which corresponds to several periods of the electromagnetic field.

The logic unit 14 of the transponder further comprises storing means (ROMs, EEPROMs or other types of memories) containing a code/address of the transponder and other information stored during fabrication or at a later stage.

Figure 2:
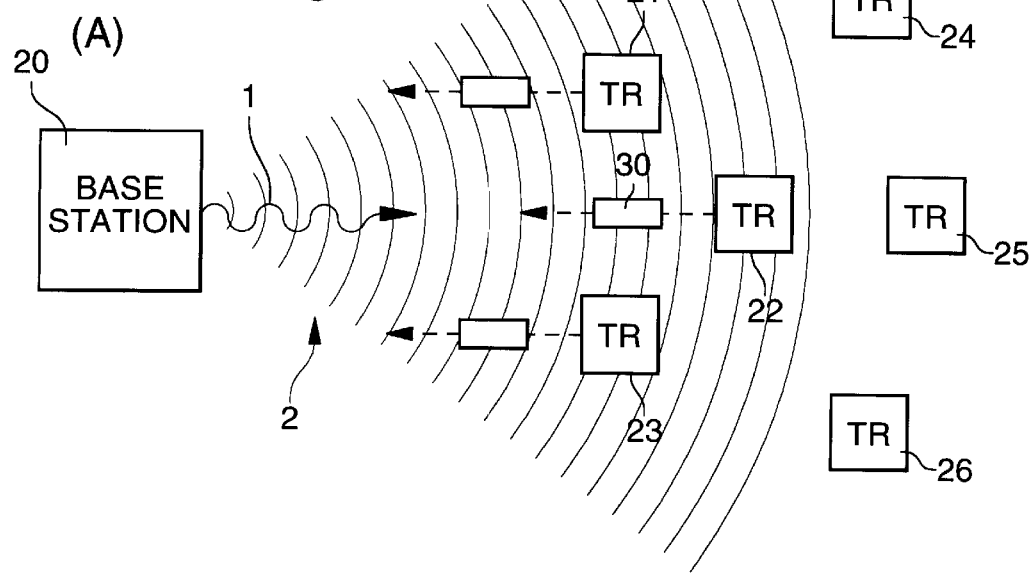
FIG. 2 presents schematically the operating principle of the communication system according to the present invention.
Figure 2:
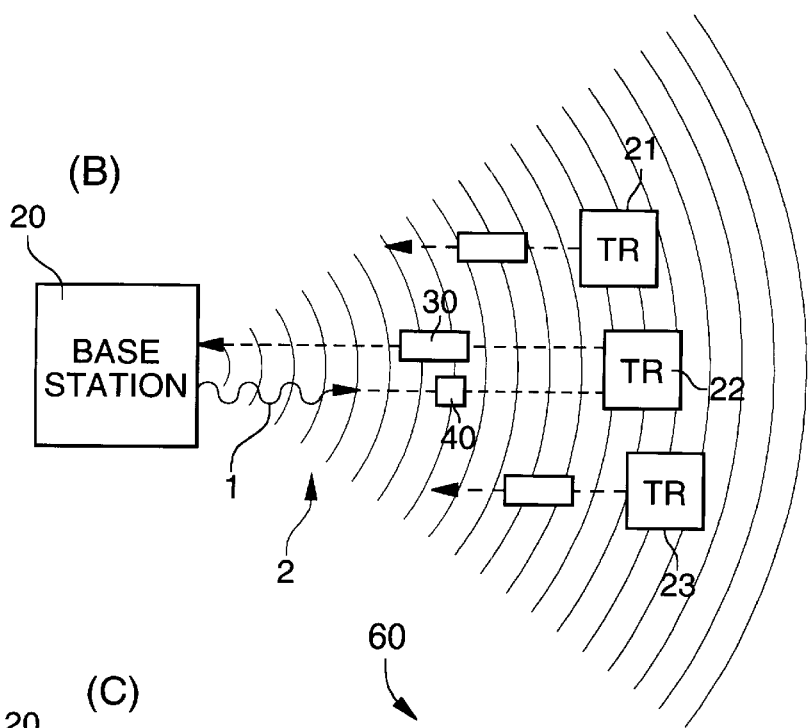
Figure 2:
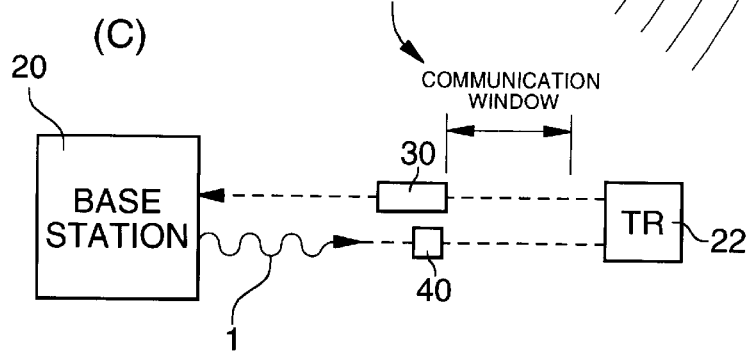

FIG. 2 illustrates schematically the operating principle of the communication system according to the present invention. The base station 20 operates in a way which can globally be divided in three phases, an interrogation phase (A), an identification and communication initiation phase (B) and a communication phase (C). As mentioned above, transponders 21 to 26 are indicated generally by reference TR.

The interrogation phase (A) is characterized by the emission by the base station 20 of an electromagnetic field 1 at a determined frequency. This electromagnetic field 1 defines a communication volume 2 in which one or more transponders 21, 22 and 23 among the plurality of transponders 21 to 26 are susceptible to be situated. The transponders 21, 22 and 23 which are enclosed in the communication volume 2 are activated and interpret the presence of the electromagnetic field 1 as an interrogation signal. Each transponder 21, 22 and 23 thus subjected to the electromagnetic field 1 responds to this interrogation by generating an identification message 30 specific to each of the transponders.

The identification and communication initiation phase (B) begins upon reception by the base station 20 of an identification message 30 emanating from any transponder among the transponders 21, 22 and 23 subjected to the electromagnetic field 1, in this example transponder 22. Upon reception of the identification message 30, the base station 20 proceeds to check the validity of the identification message 30. At the same time, the base station 20 generates a brief signal 40, designated in the present invention as a communication initiation signal, in the form of a modification of the electromagnetic field 1, which indicates to the selected transponder 22 that its identification message 30 is being processed and that it must, at the end of the emission of this message, open a communication window 60. This communication initiation signal 40 is generated during a predetermined period relatively to the generation of said identification message 30, i.e. either during or at after the emission of the identification message 30. Transponders 21 to 26 are thus adapted to receive the communication initiation signal 40 only during this predetermined period.

The communication phase (C) as such begins after the accomplishment of the verification of the identification message 30 transmitted by the identified transponder 22. During the communication window 60, the base station 20 and the identified transponder 22 have the possibility to communicate and exchange information.

Preferably, distinct modulations are used in order to generate the identification message 30 and the signals exchanged during the communication window 60, in order to avoid that an identification message 30 emanating from another transponder might be interpreted by the selected transponder 22 as a communication emanating from the base station 20.

Figure 3:
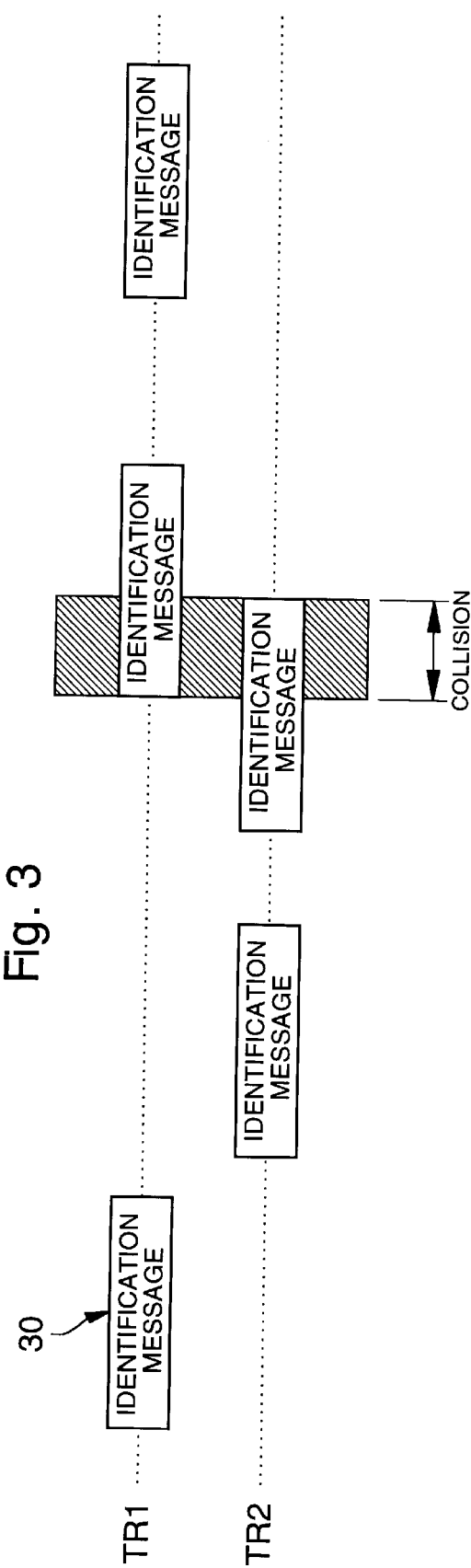
FIG. 3 shows schematically an emission example of an identification message emanating from two transponders subjected to an electromagnetic interrogation field.

According to the present invention, the identification message 30 is preferably repeated after long pauses of random duration in order to reduce the probability of collisions between multiple identification messages 30. Indeed, during these pauses the transponder TR remains inactive, thus allowing the base station 20 to detect an identification message 30 emanating from another transponder. This also allows to avoid that two or more identification messages 30 perpetually collide. FIG. 3 illustrates schematically this principle in the case where two transponders are subjected to the electromagnetic field 1. In addition, it has to be pointed out that the duration of the pauses is preferably significantly greater than the duration of an identification message 30.

Figure 4:
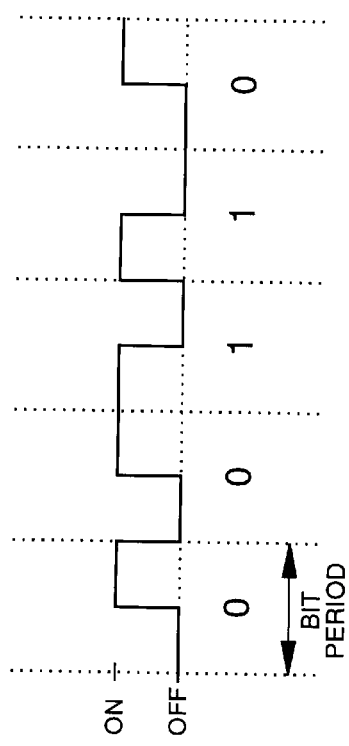
FIG. 4 shows a coding example in Manchester code.

Several types of coding may be used in order to code the signals exchanged between the base station 20 and the transponder TR, such as a Manchester code for example. FIG. 4 presents an example of a Manchester code. This code is characterized by a negative or positive transition in the middle of a bit period. "1" is represented by an ON-OFF sequence and "0" is represented by an OFF-ON sequence. The bit period is fixed to a multiple of the period of the electromagnetic field 1.

FIG. 5 presents an example of the structure of an identification message 30 as defined in the present invention. The identification message 30 comprises a first initialisation sequence 31 followed by coded information 32 containing an identification code of the transponder. The initialisation sequence 31 is used to synchronise the base station 20 and the transponder. In the example of FIG. 5, the initialisation sequence 31 consists of a series of seven bits at "0" and one bit at "1" followed by five bits of coded information 32.

The communication initiation signal 40 transmitted by the base station 20 consists of one or more brief interruptions of the electromagnetic field 1 which are generated during a predetermined period relatively to the generation of the identification message 30, these interruptions having a duration which is shorter than a bit period. In the example of FIG. 5, which is not limitative, the communication initiation signal 40 consists of two brief interruptions 51 and 52 of the electromagnetic field 1 generated during the first and fifth bit of coded information 32. An interruption may be generated at any time during a bit period but preferably during the period where modulator 11 (FIG. 1) is ON. Indeed, during this period, the resonant circuit of the transponder is unloaded and the self oscillation of the transponder is accordingly more rapidly absorbed than this would be the case if the resonant circuit was loaded. The monostable trigger 16 together with the logic unit 14 are here adapted to detect interruptions of the electromagnetic field 1 during the first and fifth bits of coded information 32.

With reference to FIGS. 6A to 6C, three embodiments of the communication system according to the present invention will be presented. Other embodiments might be envisaged by the man skilled in the art.

FIG. 6A presents a first embodiment in which the identified transponder 22 simply transmits information 34 to the base station 20 during the communication window 60. In this embodiment, the communication initiation signal 40 is interpreted by the identified transponder 22 as a request for information, the latter thus opening a communication window 60 in order to transmit the required information 34. This embodiment may typically be applied to handle goods where one solely wish to read specific information stored in the memory of the identified transponder 22, such as the price of an item.

FIG. 6B presents another embodiment of the present invention in which the base station 20 transmits a command 44 which is subsequently executed by the identified transponder 22. In response to the communication initiation signal 40, the identified transponder 22 thus opens a communication window 60 in order to receive a command 44 from the base station 20. This command 44 is interpreted and thereafter executed by the identified transponder 22. This embodiment is typically applicable to anti-theft or access control systems.

FIG. 6C presents another embodiment of the present invention in which the base station 20 transmits a request 42 for information 34 stored in the memory of the identified transponder 22, and then sends a command 44 which is subsequently executed by the identified transponder 22. In response to the communication initiation signal 40, the identified transponder 22 thus opens a communication window 60 allowing it to successively receive the request 42, transmit the required information 34 and then receive the command 44. This embodiment allows to adapt the command 44 according to the information 34 transmitted by the identified transponder.

FIG. 7 illustrates the situation where no signal containing either a request, a command or any other information is received by the identified transponder 22. Each transponder TR is preferably adapted to detect whether a signal is emitted by the base station 20 during a period of predetermined duration defined at the beginning of the communication window 60. If no signal containing information is detected, the identified transponder 22 closes the communication window 60 and continues to emit its identification message 30 after a pause.

One will point out that the duration of the communication window 60 can be variable. The end of the communication window 60 can, for example, coincide with the end of the transmission of information 34 as described in the embodiment of FIG. 6A, to a command 44 as described in the embodiments of FIGS. 6B and 6C, or to the absence of any exchange of information during the period of predetermined duration defined at the beginning of the communication window 60 (FIG. 7).

What is claimed is:

1. A contactless electronic communication system comprising a base station and a plurality of transponders, the base station comprising transmission means for emitting an electromagnetic field defining a communication volume in which a plurality of transponders are situated, each transponder comprising means for receiving said electromagnetic field and means for generating, in response to said electromagnetic field, an identification message readable by the base station, said base station further comprising means for receiving said identification message emanating from any transponder among said plurality of transponders, and processing means for checking the validity of said identification message, wherein the base station comprises means for generating during or following said identification message, communication initiation signals destined to said plurality of transponders, said base station providing a communication initiation signal to each transponder from which it receives an identification message, each transponder including means for opening a communication window in response to said communication initiation signal only when said communication initiation signal is received during a predetermined period relative to the generation of said identification message.

2. A communication system according to claim 1, wherein said means for generating said communication initiation signal comprises means for generating a communication initiation signal comprising one or more brief interruptions of the electromagnetic field.

3. A communication system according to claim 1, wherein said means for generating an identification message comprises means for generating an identification message comprising an initialization sequence followed by coded information containing a code identifying the transponder, said initialization sequence allowing synchronization of the base station to the identification message.

4. A communication system according to claim 1, wherein the means for generating the identification message comprises means for repeating the identification message after a pause of random duration in order to reduce the probability of collisions between identification messages emanating from multiple transponders.

5. A communication system according to claim 1, wherein at least one signal containing information is exchanged during said communication window between the base station and an identified transponder.

6. A communication system according to claim 5, wherein, during said communication window, said identified transponder transmits information to the base station.

7. A communication system according to claim 5, wherein, during said communication window, the base station generates a command which is subsequently executed by said identified transponder.

8. A communication system according to claim 5, wherein, during said communication window, the base station generates a request in response to which the identified transponder transmits information, and then a command which is subsequently executed by said identified transponder.

9. A communication system according to claim 5, wherein said identified transponder continues to generate the identification message if it does not detect any signal during a period of predetermined duration defined at the beginning of said communication window.

\* \* \* \* \*